(12) United States Patent
Laurila et al.

(10) Patent No.: US 6,314,166 B1
(45) Date of Patent: Nov. 6, 2001

(54) METHOD FOR DIALLING A TELEPHONE NUMBER BY VOICE COMMANDS AND A TELECOMMUNICATION TERMINAL CONTROLLED BY VOICE COMMANDS

(75) Inventors: Kari Laurila; Markku Mettälä, both of Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/071,966

(22) Filed: May 4, 1998

(30) Foreign Application Priority Data

May 6, 1997 (FI) .......................................... 971925

(51) Int. Cl.[7] .................................................. H04M 1/64
(52) U.S. Cl. .................... 379/88.03; 379/88.01; 379/88.04
(58) Field of Search .............................. 379/88.01, 88.02, 379/88.03, 88.04, 354, 355, 88.27

(56) References Cited

U.S. PATENT DOCUMENTS

| | | | |
|---|---|---|---|
| 4,870,686 | * 9/1989 | Gerson et al. | 704/234 |
| 5,640,485 | 6/1997 | Ranta | 704/251 |
| 5,864,603 | * 1/1999 | Haavisto et al. | 379/88.01 |
| 5,915,239 | * 6/1999 | Haavisto et al. | 704/275 |
| 5,917,890 | * 6/1999 | Brotman et al. | 379/88.01 |
| 6,154,526 | * 11/2000 | Dahlke et al. | 379/88.03 |

FOREIGN PATENT DOCUMENTS

| | | | |
|---|---|---|---|
| 0404502 A2 | 12/1990 | (EP) . | |
| 0404502 A3 | 12/1990 | (EP) . | |
| 0676882 A3 | 10/1995 | (EP) . | |
| 0676882 | * 10/1995 | (EP) | H04M/1/27 |

OTHER PUBLICATIONS

Finnish Office Action & Search Report.

* cited by examiner

Primary Examiner—Fan Tsang
Assistant Examiner—Ovidio Escalante
(74) Attorney, Agent, or Firm—Perman & Green, LLP

(57) ABSTRACT

In the method of the invention for dialling a telephone number by voice commands, the telephone number to be dialled can be uttered either as one or as several number strings or identifications, which are recognized in order to find out which number string or identification was uttered. An incorrectly recognized number string or identification will be marked incorrect.

8 Claims, 3 Drawing Sheets

| User | Recognizer unit | User | Recognizer unit |
|---|---|---|---|
| "SELECT NUMBER" | | "SELECT NUMBER" | |
| | "GIVE NUMBER" | | "GIVE NUMBER" |
| "123" | | "123" | |
| | "123" | | "123" |
| "456" | | "456" | |
| | "476" | | "476" |
| "ERROR" | | "ERROR" | |
| | "CORRECTION", "123" | | "123" |
| "456" | | "456" | |
| | | | "476" |
| | | "ERROR" | |
| | | | "123" |
| | | "456" | |
| | "456" | | "456" |
| "789" | | "789" | |
| | "789" | | "789" |
| "DIAL" | | "DIAL" | |
| | "123456789" | | "123456789" |

Fig 2

| User | Recognizer unit | User | Recognizer unit |
|---|---|---|---|
| "SELECT NUMBER" | | "SELECT NUMBER" | |
| | "GIVE NUMBER" | | "GIVE NUMBER" |
| "123" | | "123" | |
| | "123" | | "123" |
| "456" | | "456" | |
| | "476" | | "476" |
| "NEXT" | | "ERROR" | |
| | "CORRECTION", "456" | | "123" |
| ——————— | | "456" | |
| | | | "456" |
| "789" | | "789" | |
| | "789" | | "789" |
| "DIAL" | | "DIAL" | |
| | "123456789" | | "123456789" |

METHOD FOR DIALLING A TELEPHONE NUMBER BY VOICE COMMANDS AND A TELECOMMUNICATION TERMINAL CONTROLLED BY VOICE COMMANDS

BACKGROUND OF THE INVENTION

1. Field of the Invention

The present invention relates to a method presented in the preamble of the appended claim 1 for dialling a telephone number by voice commands. Further, the invention relates to a telecommunication terminal presented in the preamble of the appended claim 5.

2. Description of the Prior Art

A telephone number is usually dialled by using the selecting disc or dialling keys of a telecommunication terminal. However, there may be situations when it would be necessary to dial a telephone number e.g. by speaking the telephone number. Particularly for use in automobiles, so-called hands-free modes have been developed, wherein the driver of the vehicle does not need to loose hold of the steering wheel for dialling a telephone number. The dialling of the telephone number is thus conducted by speaking the telephone number to be dialled. This kind of a hands-free mode is practical also e.g. in offices. In the simplest way, this kind of dialling of a telephone number by voice commands works in a way that the user of the telecommunication terminal says the telephone number to be dialled digit by digit, wherein after saying the whole number, a speech recognizer unit in the telecommunication terminal searches the number sequence that the speech recognizer unit interprets to best correspond to the number sequence recited by the user. The interpretation is based e.g. on the fact that the speech recognizer unit calculates one or several feature vectors on the basis of the audio signal received. The speech pattern memory of the voice recognizer unit contains e.g. speech patterns corresponding to numeral digits, and these are used in combination with the feature vectors calculated from the audio signal for calculating the recognition result by using methods known as such.

Telephone numbers are usually very long, commonly number sequences containing at least seven numeral digits, wherein the number of various combinations is very large: with a sequence of seven numerals, there are 10,000,000 alternative combinations. When making calls to mobile stations, to telecommunication terminals of different directory areas, or from one country to another, the length of a telephone number can be as long as 15 numeral digits. The large number of alternative combinations sets high demands on the operation of a device to be controlled by voice commands, so that the number of incorrect recognitions could be reduced to the minimum. In the above-mentioned situation of dialling a telephone number consisting of seven numeral digits, incorrect recognition of even one numeral digit will lead to incorrect dialling.

U.S. Pat. No. 4,870,686 discloses a telecommunication terminal controlled by speech recognition, wherein the telephone number to be dialled can be uttered in one or several digit strings. Each digit string is recognized separately, wherein the number of alternatives for each digit string is considerably smaller than in a situation when the whole telephone number is recognized as one digit string. For example, the telephone phone number "1234567" can thus be uttered e.g. in digit strings "12", "34", "567", wherein the number of different dialling alternatives is one hundred for the first and second digit strings and one thousand for the third digit string. Thus, the probability that each digit string will be recognized correctly is considerably higher than if the whole telephone number were recognized as one number sequence. However, also this dialling method has the disadvantage that if any of the digit strings is recognized incorrectly the first time, in which case the user will control the speech recognizer unit to recognize this numeral sequence again, the speech recognizer unit can make the same incorrect interpretation also the next time. In the worst case, the user must repeat the whole number sequence, and even this will not guarantee that the speech recognizer unit can recognize the uttered telephone number correctly. This unreliability of recognition is due to a number of various factors. For example, the recognition of the telephone number can be interfered by noise conditions. Furthermore, many recognizer units are advantageously programmed at the manufacturing stage so that an average speech pattern for each number from zero to nine is stored in the speech pattern memory of the recognizer unit. However, different users will pronounce the numbers in slightly different ways, which will not necessarily always result in equally good recognition for different users, wherein the error rate can be different when different persons use such a telecommunication terminal controlled by voice commands. In these situations, it is possible to use recognizer units which can be taught to recognize the user's voice, i.e. the user pronounces the numbers from zero to nine, wherein the speech recognizer unit stores the speech patterns corresponding to the numbers in the speech pattern memory. Nevertheless, this will not eliminate all incorrect recognitions, e.g. under the influence of noise or the user's voice which is changed for any reason.

Further, such voice-controlled telecommunication terminals have been developed in which the user can store the telephone numbers desired and an identification corresponding to these, such as the name of a firm and/or a person. Thus the selection of the telephone number can be made by uttering the identification, on the basis of which the speech recognizer unit compares the identifications stored and conducts dialling on the basis of this comparison. In such a device, where the identification can be divided into sub-identifications, the recognizer unit conducts a comparison of sub-identifications and after correct recognition of the sub-identification, the user utters the next sub-identification. When a sufficient number of sub-identifications have been uttered to identify the telephone number, the telecommunication terminal conducts dialling of the telephone number. Also in this kind of a telecommunication terminal, the problem may occur that the identification or sub-identification is continually recognized incorrectly and the correct telephone number cannot be dialled.

OBJECTS OF THE INVENTION

One purpose of the present invention is to eliminate the disadvantages mentioned above to a great extent and to provide dialling of a telephone phone number by voice commands as accurately as possible. The invention is based on the idea that when the user utters a telephone number, a part of the telephone number or an identification, after an incorrect recognition this recognition is marked incorrect by the recognizer unit, wherein when the user repeats said number sequence or identification, the recognizer unit will no longer offer the recognized incorrect alternative but the alternative which according to the calculation by the recognizer unit is next probable and which is not marked incorrect. Thus, the number of alternative combinations is reduced after each incorrect recognition, wherein the correct number sequence or identification is worked out at the latest when there is only one alternative left. The method according to the present invention is characterized in what will be presented in the characterizing part of the appended claim 1. Further, the telecommunication terminal according to the present invention is characterized in what will be presented in the characterizing part of the appended claim 5.

The present invention gives significant advantages. Using the method of the invention, the operation of speech-controlled telecommunication terminals can be improved to a significant extent e.g. for the reason that the recognizer unit will not offer the same alternative again after an incorrect recognition. Also in disturbance conditions, the telecommunication terminal of the invention is more reliable than speech-controlled telecommunication terminals of prior art. Moreover, the method of the invention improves the operation of such telecommunication terminals in which the speech recognizer unit is not a so-called "trainable" recognizer unit but in which the recognition is based on an average speech pattern.

BRIEF DESCRIPTION OF THE DRAWINGS

In the following, the invention will be described in more detail with reference to the appended drawings, in which FIG. 2 is a table comparing the operation of the method according to the first advantageous embodiment of the invention and the operation of the method according to prior art, and FIG. 3 is a table comparing the operation of the method according to the second advantageous embodiment of the invention and the operation of the method according to prior art.

DETAILED DESCRIPTION OF THE PREFERRED EMBODIMENT(S)

Figure 1:
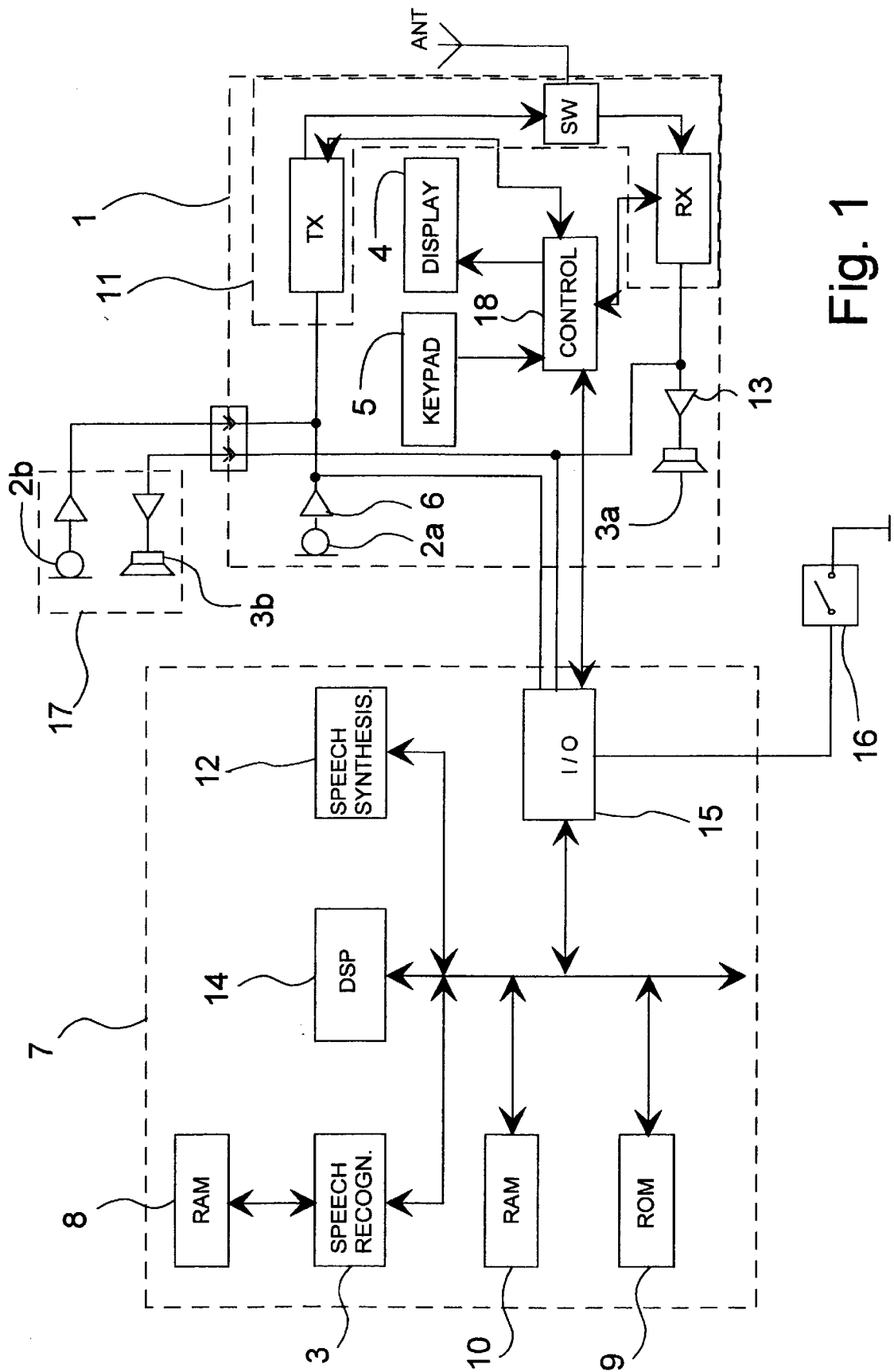
FIG. 1 is a reduced block diagram on a telecommunication terminal according to an advantageous embodiment of the invention.

The operation of the method according to the invention will be described in a speech-controlled telecommunication terminal of FIG. 1, in which the dialling of the telephone number by voice commands can be conducted by uttering the telephone number to be dialled either as a single number sequence or divided into two or more number strings. The telecommunication terminal 1 can be any telecommunication terminal, such as a landline telecommunication terminal or a wireless telecommunication terminal, e.g. a GSM mobile station. In this advantageous embodiment, the telecommunication terminal 1 comprises a user interface with a microphone 2a, a headphone 3a, a display 4, and a keypad 5. The electric signal generated by the microphone 2a is amplified in a microphone amplifier 6 and conducted in a voice command state to a recognizer unit 7. In a corresponding manner, the audio signals generated by the recognizer unit 7 are amplified in a headphone amplifier 13 and conducted to the headphone 3a. The recognizer unit 7 has a control unit 14 which is e.g. a digital signal processor DSP, a speech pattern memory 8 and a program memory 9. The speech pattern memory 8 is advantageously a non-volatile random access memory NVRAM. The program memory 9 is preferably a read-only memory (ROM) or a non-volatile random access memory. Further, the recognizer unit 7 has a random access memory (RAM) 10 for storing data during use of the device. It should also be mentioned that the speech pattern memory 8 and the program memory 9 can also be so-called FLASH memories, which is obvious to a man skilled in the art.

Signals are transferred between the recognizer unit 7 and the telecommunication terminal 1 e.g. via a matching network 15 for buffering and amplifying signals when necessary.

The speech user interface of the telecommunication terminal 1 of the invention is preferably a two-way user interface, i.e. the telecommunication terminal 1 can be given voice commands and the telecommunication terminal 1 can generate responses to the commands either by speech prompts and/or via a display unit 4. The speech prompts can be generated advantageously with a speech synthesizer 12 or by a digital signal processor DSP, wherein the speech prompts are stored in advance e.g. in the program memory 9 of the recognizer unit 7. The memory capacity required by the speech prompts can be reduced by storing the speech prompts using a speech coding method, known as such.

Also, the telecommunication terminal 1 of FIG. 1 has a control unit 18 for controlling the operation of the telecommunication terminal, and a connecting part 11. The connecting part is one according to prior art, for connecting the telecommunication terminal 1 to a telecommunication network (not shown). The connecting part 11 is for example in a GSM mobile station a radio part comprising advantageously a transmitter TX, a receiver RX, an antenna switch SW, and an antenna ANT. The telecommunication terminal 1 of FIG. 1 can be used also as a conventional telecommunication terminal, wherein the dialling of the telephone number can be conducted by using the keypad 5. The microphone 2 and the headphone 3 can be for example the microphone 2b and headphone 3b of hands-free equipment 17, or the microphone 2a and headphone 3a of the telephone part.

Switching the telecommunication terminal 1 to a mode for control by voice commands is conducted in a way known as such, for example by the menu functions of the telecommunication terminal 1, or in a way that the telecommunication terminal 1 is connected to hands-free equipment 17 with a switch 16 for activating the voice command mode. When the telecommunication terminal 1 is in the speech-controlled mode, audio signals are received via the microphone 2a or the auxiliary microphone 2b, amplified in the microphone amplifier 6 and conducted to the recognizer unit 7. On the basis of the audio signal received, the recognizer unit 7 calculates the corresponding one or several feature vectors which are processed by the recognizer unit 7 in order to find out which command or number was uttered by the user. This is conducted in a way known as such, for example by comparing the calculated feature vector with the speech patterns stored in the speech pattern memory 8. The speech pattern memory 8 contains also speech patterns corresponding to different commands. For each command to be recognized, the recognizer unit 7 generates advantageously several possible alternatives and their order of probability, wherein the first proposal is the alternative for which the recognizer unit 7 has calculated the greatest probability.

The dialling of a telephone number is started for example by uttering the command "SELECT NUMBER". After this, the recognizer unit 7 generates the message "GIVE NUMBER" on the display or produces a corresponding sound message in the headphone 3a, 3b. An advantage of the sound message is that the user does not need to turn his/her eyes to the display means 4 which might be difficult in some situations. After this, the user utters the desired telephone number either as a single number sequence or as two or more number strings. As an example, the telephone number "1234567" is used, which is uttered by the user in three number strings: "12", "34" and "567". The user starts by uttering the number string "12". After this, the recognizer unit 7 makes a comparison to the data in the speech pattern memory and concludes for example that the user uttered the numeral string "98". The recognizer device 7 generates this recognized numeral string "98" to the display means 4 and/or as a sound message to the headphone 2a, 2b. The user notices that the dialling was incorrect, wherein the user utters in a manner known as such for example the command "ERROR". Following this, the recognizer unit 7 marks this number string incorrect, possibly repeats the number strings already recognized correctly (if any are yet recognized) as a sound message in the headphone 3 and/or as a text message on the display means 4, and remains waiting for the number string to be uttered again by the user. From this repetition of the correctly recognized part of the telephone number, the user can conclude that the recognizer unit recognized the "ERROR" command correctly, i.e. it is a kind of acknowledgement message to the user. After the user has uttered said number string again, the recognizer unit 7 makes a new recognition with the difference that it ignores the number string "98" which was found incorrect. Next, the recognizer unit 7 proposes a new number string. If the recognition is now correct, the user utters the next number string which is again recognized by the recognizer unit 7. If the recognition is again incorrect, the dialling is marked incorrect, the correctly recognized part of the telephone number is repeated, and a new recognition is made. Proceeding this way, the whole telephone number is finally correctly recognized for dialling. The dialling of the number is conducted for example by uttering the command "DIAL". After this, the operation is continued in a way known as such by calf set-up, which does not need to be discussed in more detail in this context.

In an error situation, the recognizer unit 7 can also operate in a way that in response to the "ERROR" command or the like, the recognizer unit 7 generates the message "CORRECTION" and first after this repeats the correctly recognized number strings. In some situations, this "CORRECTION" message makes it easier for the user to notice that the recognizer unit 7 recognized the "ERROR" command correctly.

It is possible that the user wishes to confirm before call set-up that the number recognized by the recognizer unit is really correct. This can be made by uttering e.g. the command "CONFIRM", after which the recognizer unit repeats the telephone number advantageously as a sound message and simultaneously also asks the user if he/she wishes to set up a call. If the number is correct and the user wishes to set up a call after this, he/she utters the command "DIAL", as described above. Otherwise a call will not be set up.

Consequently, the recognizer unit 7 of the invention generates at least one dialling alternative for each number string uttered. The recognizer unit 7 can also operate in a way that it generates several alternative number strings for which it calculates a probability value. Thus the first selection is the number string with the highest probability value. If the selection is incorrect, the user may not necessarily need to repeat the number string but the user can utter the command "NEXT" instead, after which the recognizer unit 7 proposes the number string with the next highest probability value. If this is also incorrect, the next one is proposed again, and so on, until all the number strings for which a probability value has been calculated have been gone through, or until the correct number string has been found. If none of the number strings corresponds to the number string uttered by the user, the recognizer unit 7 will request the user to utter the number string again. In this case the recognizer unit 7 will no longer propose the number strings that were found incorrect in the previous phase.

For implementing the method according to the invention, the data memory 10 of the recognizer unit 7 is provided for example with a table in which the recognizing values of an uttered number string will be stored. An advantageous example of this is shown in Table 1. Here the user has uttered the number string "12". The recognizer unit 7 has calculated the probability values for a few alternatives, the number string "98" having the highest probability value, the number string "92" having the next highest value, the number string "12" having the next highest value, and still one recognition being calculated for the number string "18". Moreover, the lines of the table contain the incorrect data, which at the beginning is 0, i.e. there are no incorrect number strings known yet. After the recognizer unit 7 has proposed the number string "98" and the user has announced that it is incorrect, the recognizer unit 7 sets the error data on said line in another state, e.g. in the logical 1 state. Thus, when conducting the recognition again, the recognizer unit 7 will find that the error data of said line is 1 and will pass this line by moving on to the next line, which in this case is also incorrect. After the whole number string is recognized correctly (in this example the third alternative), the recognizer unit 7 will add this number string to the end of the number strings possibly recognized already, reset the content of the table to zero, and remain waiting for the next number string or, if the whole telephone number has already been recognized correctly, the recognizer unit 7 will move on to dialling the telephone number. Table 2 shows a situation in which the recognizer unit has found the correct number sequence. It is obvious that this table can be implemented in a number of various ways which are prior art known to a man skilled in the art.

TABLE 1

| Recognition | Error |
| --- | --- |
| "98" | 0 |
| "92" | 0 |
| "12" | 0 |
| "18" | 0 |

TABLE 2

| Recognition | Error |
| --- | --- |
| "98" | 1 |
| "92" | 1 |
| "12" | 0 |
| "18" | 0 |

The invention can also be applied in such speech-controlled telecommunication terminals, in which the telephone number can be selected also by using identifications and/or sub-identifications. Thus the procedure corresponds in its general outline to the number selection presented above, wherein an identification corresponds to a telephone number and a sub-identification corresponds to a part of the telephone number, and the comparison is made on the basis of these identifications and possibly sub-identifications.

The appended FIG. 2 illustrates the operation of the method according to the first advantageous embodiment of the invention, as well as for comparison the operation of the method according to prior art in table form, wherein the left hand side 201 of the table 200 illustrates the method of the invention and the right hand side 202 of the table illustrates the method of prior art. The user intends to dial the telephone number "123456789" by uttering it in three number strings: "123", "456" and "789". The user columns 203, 205 contain the commands uttered by the user of the telecommunication terminal, and the recognizer unit columns 204, 206 contain the messages generated by the recognizer unit to the user, respectively.

Further, the appended FIG. 3 illustrates the operation of the method according to the second advantageous embodiment of the invention, as well as for comparison the operation of the method according to prior art in table form, wherein the left hand side 301 of the table 300 illustrates the method of the invention and the right hand side 302 of the table illustrates the method of prior art. The user columns 303, 305 contain the commands uttered by the user of the telecommunication terminal, and the recognizer unit columns 304, 306 contain the messages generated by the recognizer unit to the user, respectively.

The invention is not limited solely to the embodiments presented above, but it can be modified within the scope of the appended claims.

What is claimed is:

1. Method for dialling a telephone number by voice commands, wherein the telephone number to be selected is uttered either as one or several number strings or identifications having more than one number and then recognized and presented, as recognized, for comparison with the number string or identification that has been uttered, comprising the steps of:

recognizing an uttered telephone number to be selected and presenting the number string or identification that is recognized, marking an incorrectly recognized number string or identification, that is presented, as incorrect, recognizing a re-utterance of the telephone number to be selected and presenting the recognized number string or identification of the re-utterance, but not presenting a number string or identification that is marked an incorrect, after said incorrect recognition, a sound message or a text message is generated from those number strings of the telephone number to be selected which have been recognized correctly.

2. Method according to claim 1, wherein each recognizing step comprises presenting two or more number string or identification recognition alternatives for which probability values are calculated, in that each recognition time, and selecting and presenting the recognition alternative which has the highest probability value and which is not marked incorrect.

3. Method according to claim 2, wherein after an incorrect recognition, the recognition alternative which has the next probability value of those recognition alternatives which are not marked incorrect is selected and presented.

4. Telecommunication terminal comprising means for dialling a telephone number by voice commands, which telephone number is arranged to be uttered in one or several number strings or identifications having more than one number, wherein the improvement comprises:

means for recognizing an uttered telephone number and for presenting the number string or identification that is recognized, means for marking an incorrectly recognized number string or identification, that is presented, as incorrect, means for preventing a number string or identification, which is marked incorrect, from being presented in connection with a new attempt for recognition of the number string or identification of the uttered telephone number, and means for generating a message, after said incorrect recognition, of those number strings or identifications of the telephone number to be dialled which have been recognized correctly.

5. Telecommunication terminal according to claim 4, further comprising means for announcing the recognition of the number string or identification to the user of the telecommunication terminal.

6. Telecommunication terminal according to claim 4, further comprising means for announcing an incorrect recognition in a way known as such by a voice command, e.g., an "ERROR" command.

7. Telecommunication terminal according to claim 6, further comprising means for generating an acknowledgement message from a voice command indicating an incorrect recognition.

8. Telecommunication terminal according to claim 4, wherein said terminal is a mobile station.

* * * * *